(12) United States Patent
O'Connell et al.

(10) Patent No.: US 6,182,305 B1
(45) Date of Patent: Feb. 6, 2001

(54) COOKING SINK WITH CUTTING BOARD

(75) Inventors: David J. O'Connell; Mary J. Reid, both of Sheboygan, WI (US)

(73) Assignee: Kohler Co., WI (US)

( * ) Notice: Under 35 U.S.C. 154(b), the term of this patent shall be extended for 0 days.

(21) Appl. No.: 09/512,130

(22) Filed: Feb. 24, 2000

Related U.S. Application Data

(60) Provisional application No. 60/126,795, filed on Mar. 30, 1999.

(51) Int. Cl.[7] .................................................. A47K 1/33
(52) U.S. Cl. ............................... 4/631; 269/289 R
(58) Field of Search ................... 4/631, 637, 656, 4/654, 638; 312/140.1, 140.2, 140.3, 228, 228.1; 108/25, 26, 24, 50.1 P; 134/85, 84, 82, 111, 115 R, 200; 269/289 R, 302; 99/485, 536

(56) References Cited

U.S. PATENT DOCUMENTS

| | | |
|---|---|---|
| 477,137 | 6/1892 | Mesick . |
| 2,658,205 * | 11/1953 | Bowden .................... 4/656 |
| 3,126,552 * | 3/1964 | Scharmer ................... 4/663 |
| 3,627,396 | 12/1971 | Miller ..................... 312/229 |
| 3,915,529 | 10/1975 | Bernier ................... 312/237 |
| 4,033,461 | 7/1977 | Nevai ...................... 211/86 |
| 4,041,964 | 8/1977 | Shamoon .................. 134/115 |
| 4,243,184 * | 1/1981 | Wright .................. 241/273.2 |
| 4,456,021 | 6/1984 | Leavens ................... 134/85 |
| 4,765,603 | 8/1988 | Huppert ................. 269/302.1 |
| 5,016,297 * | 5/1991 | Sauter et al. ............... 4/619 |
| 5,016,298 | 5/1991 | Ris et al. ................... 4/654 |
| 5,406,656 | 4/1995 | Somerton ................... 4/656 |

FOREIGN PATENT DOCUMENTS

| | | |
|---|---|---|
| 1150906 | 8/1983 | (CA) . |
| 26 44 569 | 8/1977 | (DE) . |
| 29 04 504 | 8/1980 | (DE) . |
| 85 35 539 | 3/1986 | (DE) . |
| 86 24 098 | 11/1986 | (DE) . |
| 2015363 | 9/1979 | (GB) . |
| 2297477 | 8/1996 | (GB) . |
| 10-033397 | 2/1998 | (JP) . |

* cited by examiner

*Primary Examiner*—Henry J. Recla
*Assistant Examiner*—Huyen Le
(74) *Attorney, Agent, or Firm*—Quarles & Brady LLP

(57) ABSTRACT

A sink with a basin which affords alternative side-to-side and front-to-back movement of a cutting board over the basin. The sink is preferably employed with a cooking chamber. Various types of cooking utensils can be employed in conjunction with the cutting board.

3 Claims, 5 Drawing Sheets

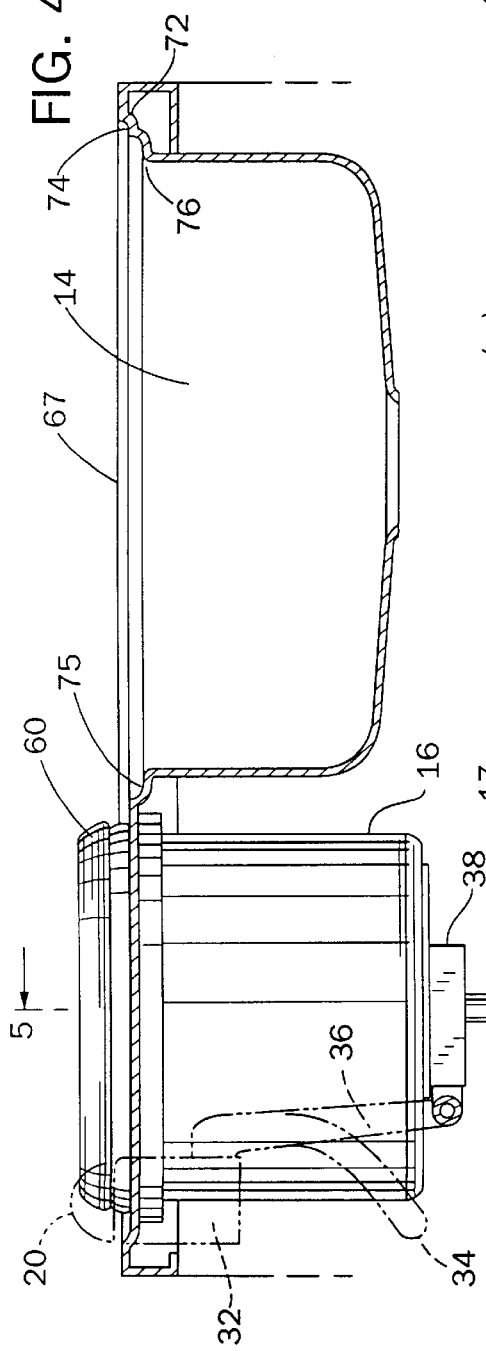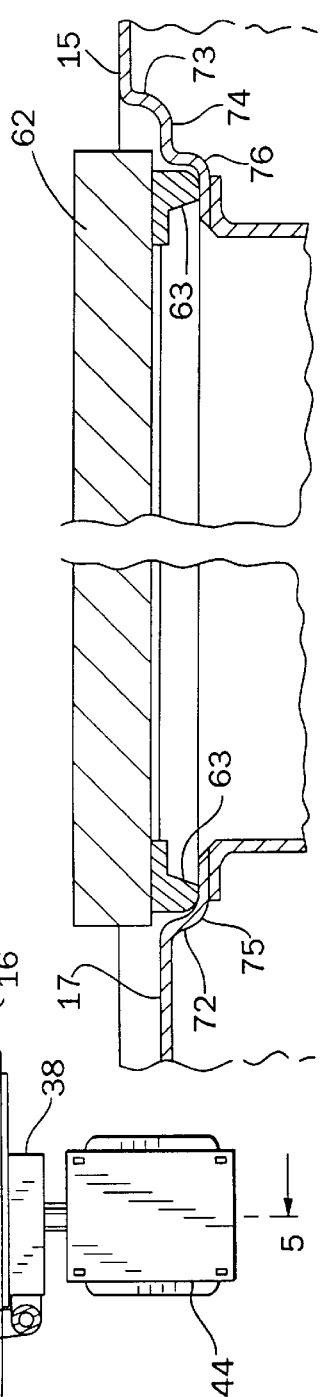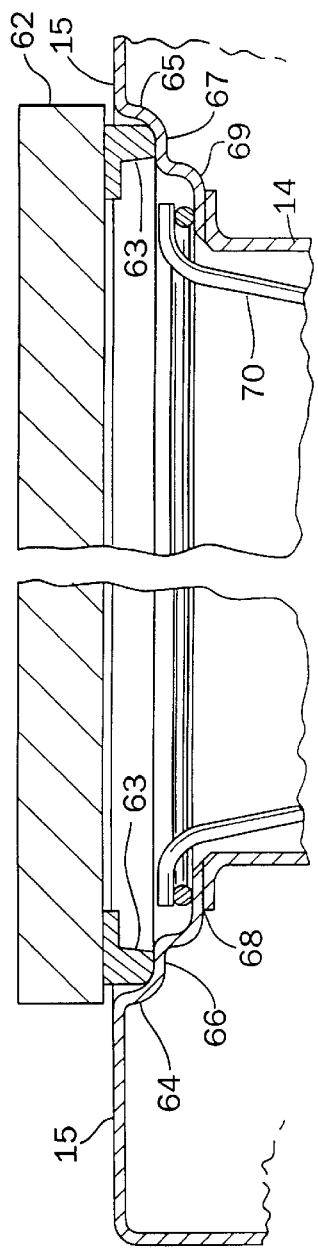

COOKING SINK WITH CUTTING BOARD

CROSS-REFERENCE TO RELATED APPLICATIONS

This application is a continuation of provisional application U.S. Ser. No. 60/126,795, filed Mar. 30, 1999.

STATEMENT REGARDING FEDERALLY SPONSORED RESEARCH OR DEVELOPMENT

Not applicable.

BACKGROUND OF THE INVENTION

The present invention relates to sinks with a basin which affords support for a slidable cutting board.

It is known to provide sinks with cooking capabilities such as a hot plate placed adjacent to a sink basin. It is also known to provide a kitchen counter top with a section that receives a built-in steamer with a drain that is connectable to kitchen plumbing. U.S. Pat. No. 4,456,021 discloses another type of sink.

Although the prior art teaches various types of sinks with basins and cooking capabilities adjacent kitchen counter tops, and various types of cutting boards, there is still a need to optimize the positioning of cutting boards relative to such sinks, particularly in kitchens where space is at a premium.

BRIEF SUMMARY OF THE INVENTION

The invention provides a sink which can support a cutting board in both a slidable side-to-side and a slidable back-to-back manner. The sink basin has first supporting surfaces and second supporting surfaces placed at first and second levels with respect to the basin and surrounding the basin. There is a cutting board member supported by two of the supporting surfaces. The cutting board member and the supporting surfaces are constructed and arranged to provide sliding movement of the board member in one direction on the first supporting surfaces and when turned 90° provides slidable support on the second supporting surfaces.

The advantages of the invention include providing flexibility in the positioning of a cutting board immediately over a sink basin, and optionally over accessories positioned in or on the basin. This is achieved by permitting both side-to-side and front-to-back sliding, where the sliding is preferably on rails at two different heights.

When no accessory (e.g. a colander) is used, the board can be turned 90 degrees and positioned farther downward into the basin. When the accessory is used, the board can also be used, immediately above it.

These and still other objects and advantages of the invention will be apparent from the description which follows. In the detailed description below, preferred embodiments of the invention will be described with reference to the accompanying drawings. These embodiments do not represent the full scope of the invention. Rather the invention may be employed in other embodiments. Reference should therefore be made to the claims herein for interpreting the breadth of the invention.

BRIEF DESCRIPTION OF THE DRAWINGS

FIG. 3 is a side elevational view taken along line 3—3 of FIG. 1;

FIG. 4 is a sectional view taken along line 4—4 of FIG. 1;

FIG. 8 is a sectional view taken along line 8—8 of FIG. 7;

FIG. 10 is a sectional view taken along line 10—10 of FIG. 9.

DETAILED DESCRIPTION OF THE INVENTION

Figure 1:
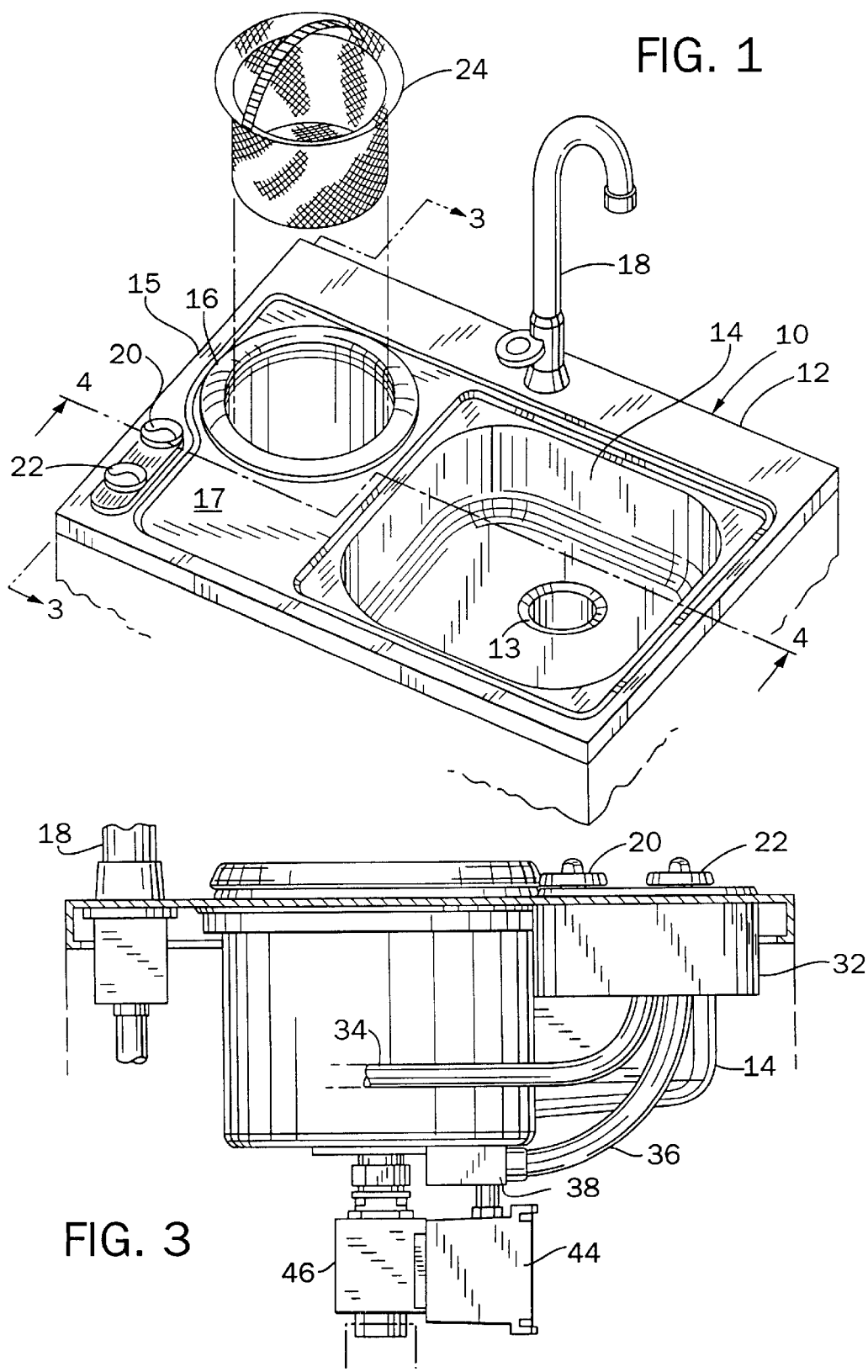
FIG. 1 is a top perspective view of the combined sink and cooking unit.
Figure 2:
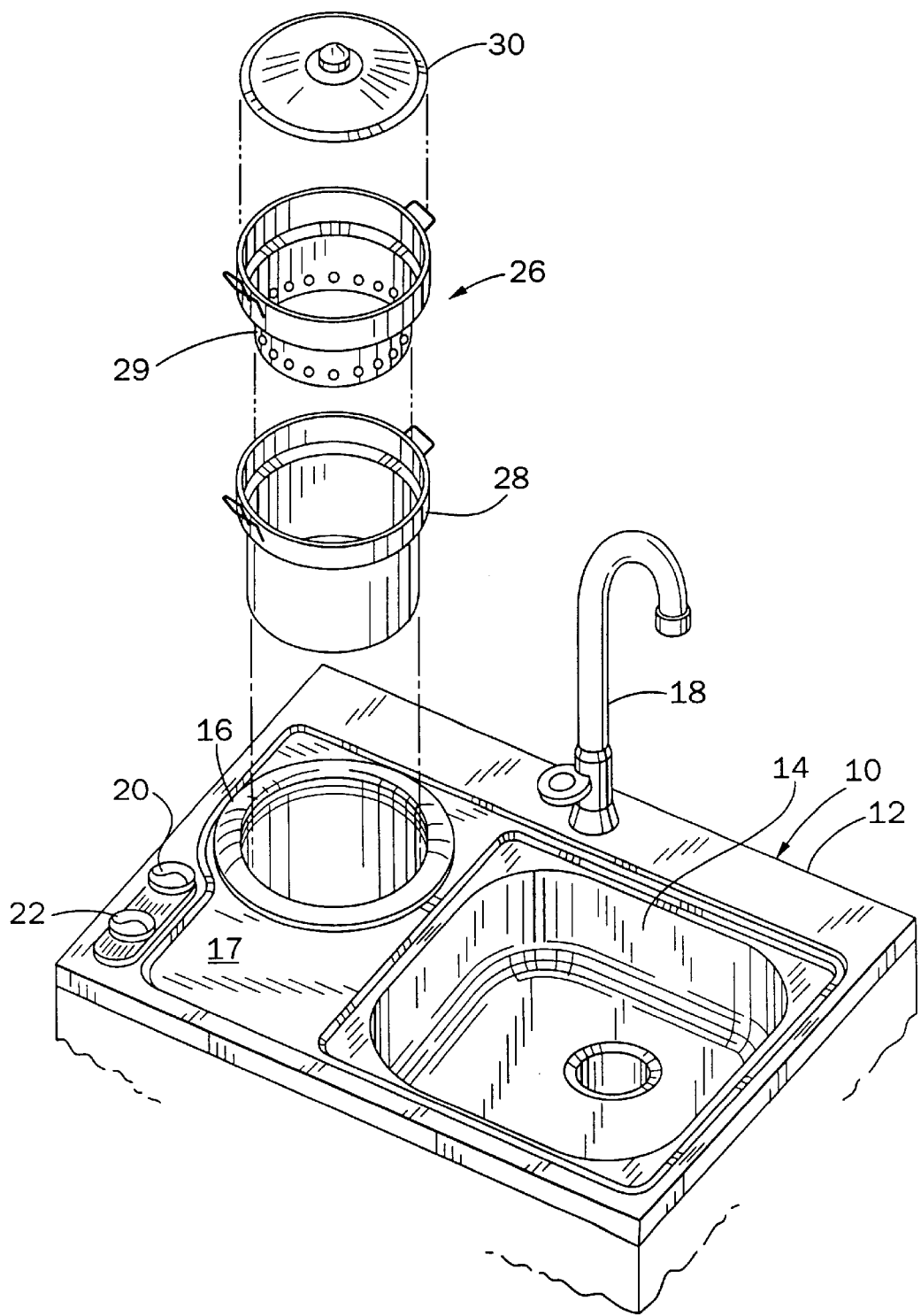
FIG. 2 is a view similar to FIG. 1 showing a different cooking utensil.

Referring to FIGS. 1–3, by way of providing a preferred environment, there is shown the combined sink and cooking unit, generally 10. It includes a sink 12 with a supporting top 15 in which are placed a basin 14 with a drain outlet 13 and a cooking chamber 16. The supporting top 15 has a recessed portion 17. A faucet 18 is provided to supply water to both the basin 14 and the cooking chamber 16. The cooking chamber 16 is designed to receive various types of cooking utensils, such as the wire basket 24 shown in FIG. 1 and the steamer 26 shown in FIG. 2 with the double boiler 28, the pasta colander 29, and the lid 30.

Figure 5:
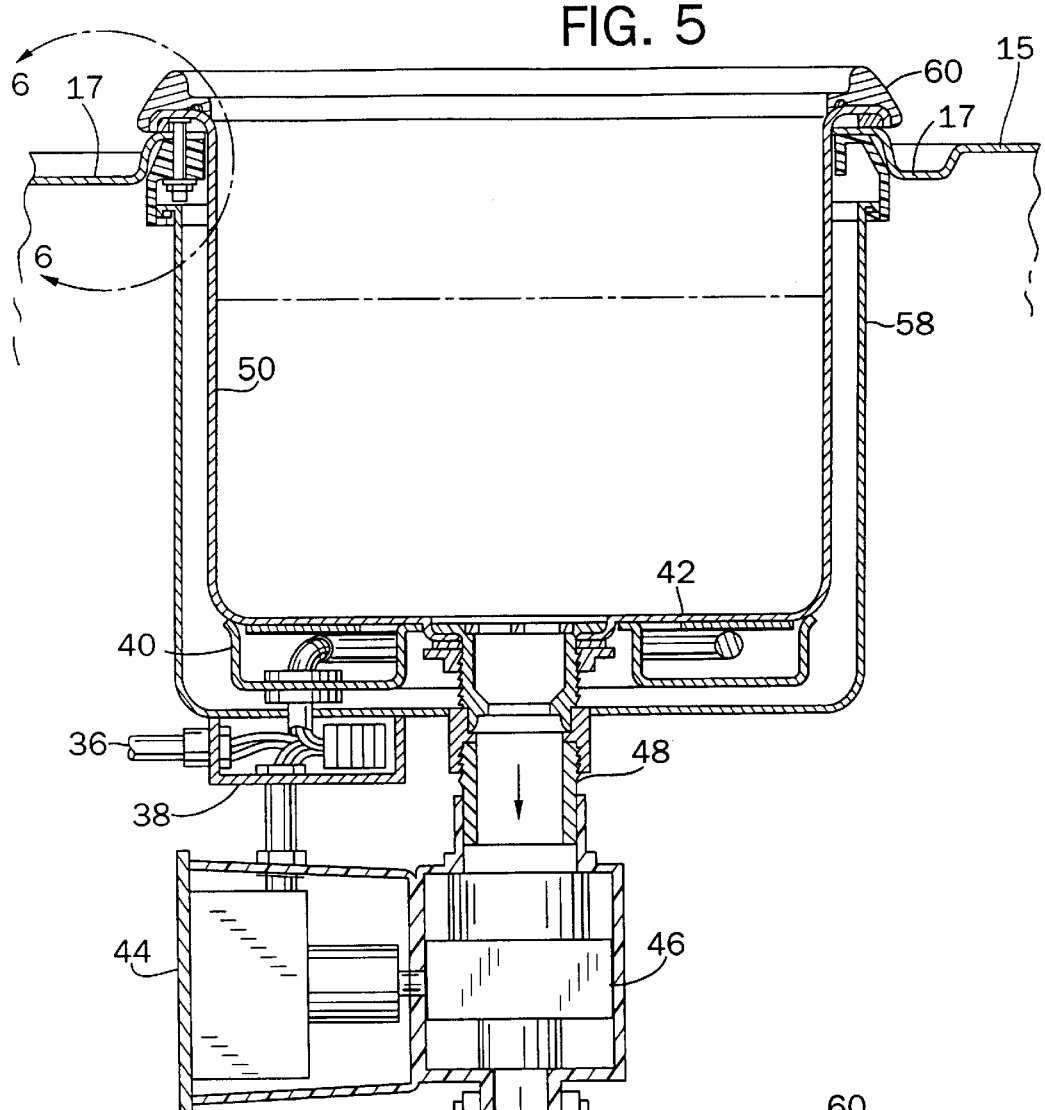
FIG. 5 is a sectional view taken along line 5—5 of FIG. 4.

Placed adjacent to the cooking chamber 16 are the control knobs 20 and 22 for controlling electrical current for heating the cooking chamber, as well as opening and closing a drain thereto. This is seen in conjunction with FIGS. 3, 4 and 5. Electrical current is supplied by line 34 which is connected to control box 32. Current from this line will be regulated in the usual manner by switches housed in control box 32 and connected to control knobs 20 and 22. Line 36 is connected to junction box 38 and supplies controlled current to both the heating element 42 and the drain control 44 which controls a drain valve 46.

A housing 40 is provided over heating elements 42. Drain control 44 activates solenoid operated drain valve 46 for draining water from drain 48 and ultimately from the cooking pot 50 of the cooking chamber 16.

Figure 6:
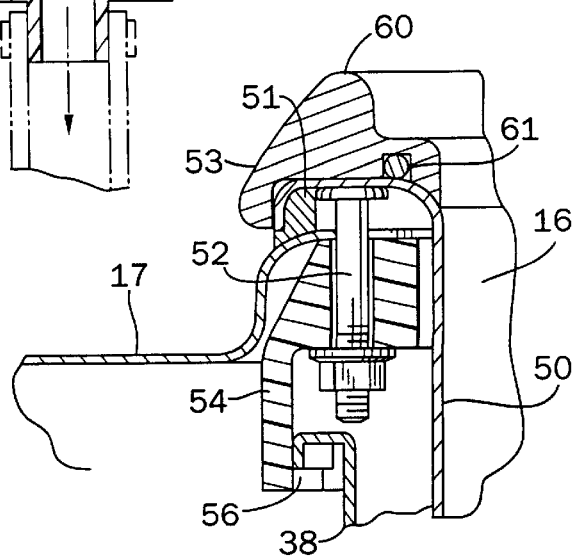
FIG. 6 is an enlarged view taken along line 6—6 of FIG. 5.
Figure 9:
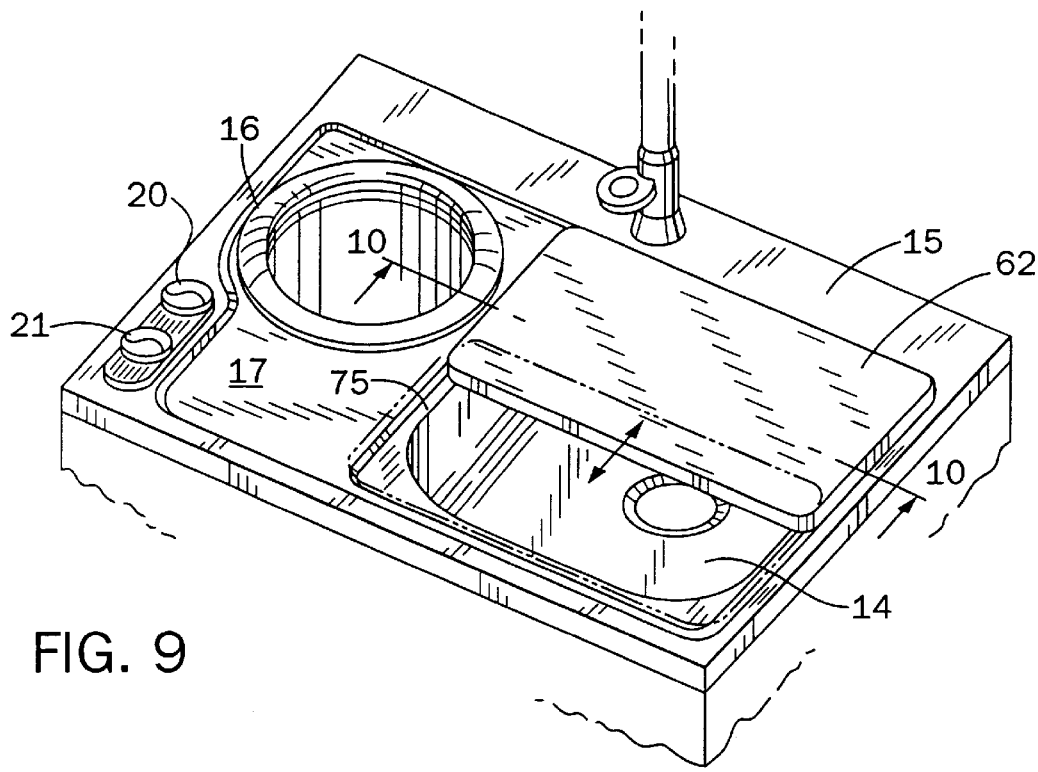
FIG. 9 is a view similar to FIG. 7 illustrating a different direction of movement of the cutting board.
Figure 7:
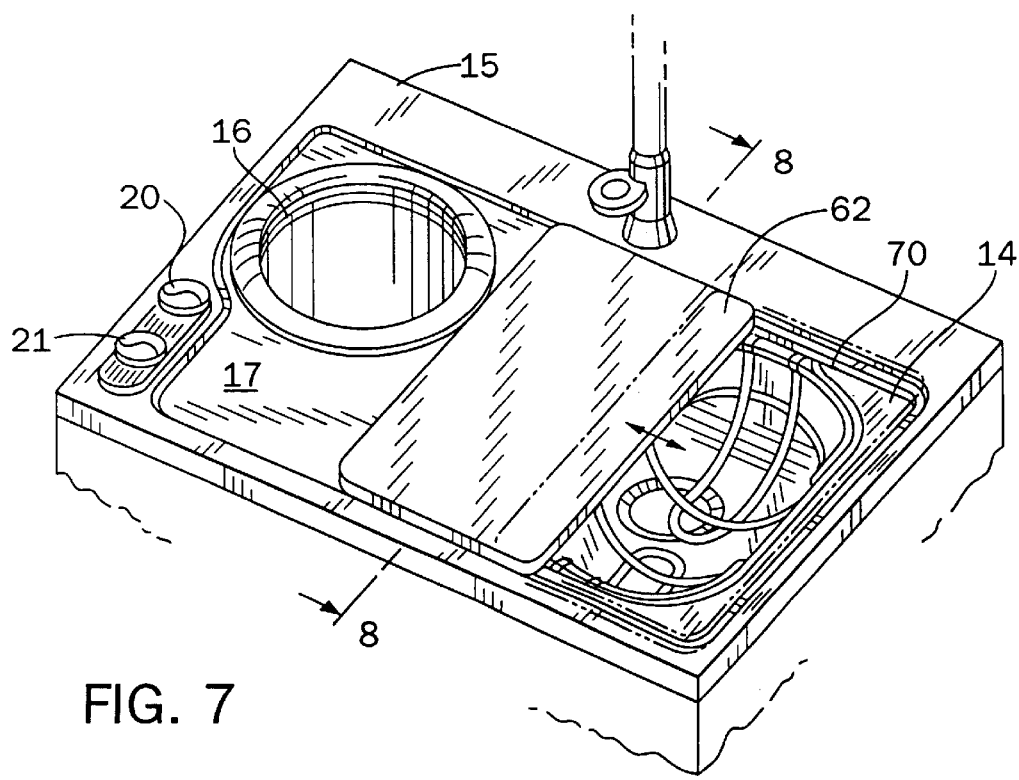
FIG. 7 is a top perspective view of the combined sink and cooking unit illustrating a cutting board and wire basket for use with the basin.

FIG. 6 illustrates the attachment of the cooking chamber 16 with pot 50 to the support top 17. A bolt 52 connected at its head to the shoulder 51 of the pot 50 is fastened to the connector 54 with the seal 53 placed between the shoulder 51 and the support top 17. Connector 54 has a support section 56 to which is connected an outer housing 58 for the cooking chamber. At the top of the cooking chamber is an insulating ring 60, the purpose of which is to prevent accidental contact with the top of the cooking pot which can be very hot. A seal 61 is disposed between the insulating ring 60 and the shoulder 51. Vents (not shown) are provided in the ring 60 to permit steam to escape when the chamber 16 is covered. They are preferably positioned at the back of the ring opposite the operator.

In accordance with the present invention depicted in FIGS. 7–10, there is shown a cutting board 62 for movement in either a side-to-side manner or front-to back manner with respect to basin 14. As seen in FIG. 8, support top 15 includes a front wall 64 and a back wall 65 with supporting surfaces provided by upper tracks or rails 66 and 67, as well as lower rails 68 and 69. Placed in upper rails 66 and 67 are the support feet 63 of cutting board 62. This affords side-to-side slidable movement in these rails and over the wire basket 70 which is supported in the lower rails 68 and 69.

If it is desired to have a front-to-back movement of the cutting board rather than a side-to-side movement, this is accomplished by removing the wire basket 70, turning the cutting board 62 90° with placement in the lower supporting surfaces provided by rails 75 and 76 which are provided in the side walls 72 and 73. This is shown in FIG. 10. It should be noted that side wall 73 also provides for an upper rail 74 which is coplanar with recessed surface 17. In effect, upper rails 66, 67 and 74 form a supporting surface or track with the recessed surface 17.

A distinct advantage of utilizing the basin 14 and the cutting board 62 is that it allows for both side-to-side and back-to-back movement of the cutting board with respect to the basin. This allows for varying access to the basin, and items positioned in it, at the discretion of the operator.

The above merely describes the preferred embodiments. The claims should be looked to in order to judge the full scope of the invention.

Industrial Applicability

The invention provides compact sink arrangements for mounting cutting boards immediately over the sink basin in multiple positions.

We claim:

1. A sink which can support a cutting board in a slidable side-to-side and slidable front-to-back manner, comprising:

a sink basin;

a first supporting surface at a first level with respect to the basin and surrounding the basin and a second supporting surface at a second level different from the first level with respect to the basin and surrounding the basin;

a fixed size cutting board member having peripheral edge portions adjacent opposite sides of the member, the cutting board member and the supporting surfaces being constructed and arranged to provide sliding movement of the peripheral edge portions of the board member in one direction on the first supporting surface and when turned 90° provides slidable support of the peripheral edge portions on the second supporting surface.

2. The sink as defined in claim 1, wherein the supporting surfaces are rails.

3. The sink as defined in claim 1, wherein the second supporting surfaces are lower than the first supporting surfaces and are constructed and arranged to support a kitchen utensil.

* * * * *